(12) United States Patent
Aboudaoud

(10) Patent No.: US 9,701,264 B2
(45) Date of Patent: Jul. 11, 2017

(54) SYSTEMS AND METHODS FOR COUPLING A POWER CONVERTER TO A FUSE TAP

(71) Applicant: Andrew Aboudaoud, Austin, TX (US)

(72) Inventor: Andrew Aboudaoud, Austin, TX (US)

(*) Notice: Subject to any disclaimer, the term of this patent is extended or adjusted under 35 U.S.C. 154(b) by 135 days.

(21) Appl. No.: 14/728,637

(22) Filed: Jun. 2, 2015

(65) Prior Publication Data

US 2015/0367791 A1 Dec. 24, 2015

Related U.S. Application Data

(60) Provisional application No. 62/015,361, filed on Jun. 20, 2014.

(51) Int. Cl.
*B60R 16/03* (2006.01)

(52) U.S. Cl.
CPC .................. *B60R 16/03* (2013.01)

(58) Field of Classification Search
CPC ..... B60R 16/03; H02J 7/00; H02J 1/10; H02J 4/00; H02M 1/00; H02M 7/44
USPC ........ 320/10, 114, 137; 307/24, 26; 361/715
See application file for complete search history.

(56) References Cited

U.S. PATENT DOCUMENTS

| | | | | |
|---|---|---|---|---|
| 6,784,567 B1* | 8/2004 | Klitzner | ................ | H01R 29/00 307/9.1 |
| 8,148,940 B2* | 4/2012 | Liu | ................ | H02J 7/0054 307/151 |
| 2007/0091575 A1* | 4/2007 | Hussaini | ................ | H02J 7/0042 361/715 |
| 2008/0122288 A1* | 5/2008 | Plante | ................ | B60R 16/03 307/10.1 |
| 2008/0123375 A1* | 5/2008 | Beardsley | ................ | H02M 1/10 363/71 |
| 2008/0231233 A1* | 9/2008 | Thornton | ................ | G06F 1/263 320/137 |
| 2010/0141213 A1* | 6/2010 | Iida | ................ | B60L 1/00 320/134 |
| 2010/0171465 A1* | 7/2010 | Seal | ................ | G03G 15/5004 320/114 |
| 2010/0254162 A1* | 10/2010 | Lanni | ................ | H02M 1/10 363/15 |
| 2013/0200690 A1* | 8/2013 | Rini | ................ | H02J 7/0031 307/9.1 |
| 2013/0234632 A1* | 9/2013 | Yamanaka | ................ | B60R 16/03 318/400.3 |
| 2014/0358367 A1* | 12/2014 | Copeland | ................ | B60R 16/03 701/36 |
| 2015/0061388 A1* | 3/2015 | Haeffner | ................ | H02M 1/32 307/26 |
| 2015/0171632 A1* | 6/2015 | Fry | ................ | H02J 7/0004 307/22 |
| 2015/0194829 A1* | 7/2015 | Smeja | ................ | H02J 7/0042 320/107 |
| 2015/0258947 A1* | 9/2015 | Harkins | ................ | B60L 1/003 307/10.1 |

* cited by examiner

*Primary Examiner* — Jared Fureman
*Assistant Examiner* — Win Htun
(74) *Attorney, Agent, or Firm* — Pierson IP, PLLC

(57) ABSTRACT

Embodiments disclosed herein describe systems and methods for coupling a power converter to a fuse tap. By coupling a power converter directly to a fuse tap, the wiring associated with the power converter and an electronic accessory may be positioned behind a dashboard of a vehicle.

8 Claims, 6 Drawing Sheets

SYSTEMS AND METHODS FOR COUPLING A POWER CONVERTER TO A FUSE TAP

CROSS-REFERENCE TO RELATED APPLICATIONS

This application claims a benefit of priority under 35 U.S.C. §119 to Provisional Application No. 62/015,361 filed on Jun. 20, 2014, which is fully incorporated herein by reference in its entirety.

BACKGROUND INFORMATION

Field of the Disclosure

Examples of the present disclosure are related to systems and methods for coupling a power converter to a fuse tap of a vehicle. More particularly, embodiments disclose directly coupling a power converter to a fuse tap of a vehicle, such that electronic components may receive power from a fused circuit.

Background

Conventionally to supply power to electronic components or accessories while in a vehicle, cigarette lighter receptacles are used. The cigarette lighter receptacle are designed to power an electrically heated cigarette lighter, but later became a standard direct current (DC) power connector coupled to the vehicle's battery to supply electrical power to electronic components.

A conventional cigarette lighter receptacle requires a socket of an electronic accessory to be inserted into the cigarette lighter receptacle to receive power. The socket may be coupled to the electronic accessory via a cable. However, while the socket is inserted into the cigarette lighter, the cable may be loose, dangle, extend across the cabin of the vehicle, etc. These loose cables cause safety hazards.

Furthermore, because a conventional cigarette lighter receptacle is not configured to operate as an electrical socket, there are inherent design flaws. For example, the cigarette lighter receptacle has an inner diameter and depth that include spring loaded contacts allowing the cigarette lighter receptacle to maintain an electrical contact within a given range of tolerances. However, the shape and design of the receptacle often causes the electronic accessory to lose electrical contact with the cigarette lighter receptacle.

Additionally, conventional cigarette lighter receptacles operate at 12 volts. Yet, this voltage may fluctuate between 9 and 14 volts. This fluctuation of voltage causes damage to the electronic accessory when coupled to the cigarette lighter receptacle.

Other electronic components, such as a vehicle's radio and lights are configured to operate at 12 volts, which corresponds to the vehicle's battery. However, if an electronic accessory requires different voltage parameters, which do not correspond with the vehicle's battery, then the electronic accessory cannot use the vehicle's battery as a direct power source.

Accordingly, needs exist for more effective and efficient systems and methods to couple a power converter to a fuse tap.

SUMMARY

Embodiments disclosed herein describe systems and methods for coupling a power converter to a fuse tap. By coupling a power converter directly to a fuse tap, the wiring associated with the power converter and an electronic accessory may be positioned: under the hood of the vehicle, behind a dashboard, and/or behind any interior panel of a vehicle. Therefore, the wiring associated with the power converter and the electronic accessory may not be external to the dashboard. Furthermore, by coupling the power converter directly to the fuse tap, if the electronic accessory requires voltage levels or parameters that are different than the vehicle's battery, then the electronic accessory may be powered via the power converter that is external to the vehicle's battery.

Embodiments disclosed herein may include a fuse connector, an input connector, a power converter, a power output, an electronic component, a toggle switch, a toggle switch override cable, a battery power sensor, a voltage threshold knob, disabling processor, and a power stabilizer.

The fuse connector may be a component of a fuse box positioned within a vehicle. The fuse connector may be conventionally coupled with a device that provides electronic resistance, and the fuse connector may be configured to supply power to an electronic device coupled to the fuse connector.

The input connector may be configured to be inserted into the fuse connector, wherein responsive to the input connector being inserted into the fuse connector, the input connector may receive power from the fuse connector.

The power converter may be a device configured to receive power from the input connector, and convert the received power to a different voltage level. In embodiments, the power converter may be positioned: within or behind a dashboard of a vehicle, within or behind another interior panel of the vehicle, or under the hood of the vehicle. Therefore, the power converter and/or the input connector are not visible and/or do not extend into a cabin of the vehicle. In embodiments, the power converter may be configured to convert the power supplied by the input connector to modify, change, convert, etc. the standard 12 volts supplied from the battery of the vehicle.

The power output may be configured to output the converted power to an electronic component, such as a dash camera. The power output may include a male coupling member configured to be inserted into a female coupling member positioned on the electronic component.

The electronic accessory may be an electrical accessory configured to receive power from the power converter via the power output, wherein different electronic accessory may provide varying functionality. For example, an electronic accessory may be a dashboard camera configured to continuously record video while the vehicle is in motion.

The toggle switch may be a hardware device configured to disable the electronic accessory receiving power from the power output. In embodiments, the toggle switch may be a binary on/off button that is positioned on an external surface of the power converter. Responsive to the toggle switch being in the on position, the electronic accessory may receive power from the power converter. Responsive to the toggle switch being in the off position, the electronic accessory may not receive power from the power converter.

The toggle switch override cable may be a cable that extends away from the external surface of the power converter. The toggle switch override cable may be a binary on/off button that can override the toggle switch. Responsive to the toggle switch override cable being in the on position, the electronic accessory may receive power from the power converter. Responsive to the toggle switch override cable being in the off position, the electronic accessory may not receive power from the power converter.

Furthermore, the toggle switch override cable may override the toggle switch settings. For example, if the toggle switch is in the on position but the toggle switch override cable is in the off position, the electronic accessory may not receive power from the power converter. Furthermore, if the toggle switch is in the off position but the toggle switch override cable is in the on position, the electronic accessory may receive power from the power converter.

The battery power sensor may be a hardware device positioned within the electronic convertor that is configured to determine a power level of the vehicle's battery. In embodiments, a conventional battery may have a voltage reading of 12.6 volts when fully charged and operational. When in use, if the battery has a dead cell, the vehicle's battery may have a voltage below 12.6 volts. In embodiments, the battery power sensor of the vehicle may be configured to determine the power level of the vehicle's battery when the vehicle is on and off. The battery power sensor may be configured to determine the power level of the vehicle's battery based on a power level received by the input connector.

The voltage threshold knob may be a hardware device configured to set an automatic disabling of output voltage based on input voltage threshold. The voltage threshold may be a threshold, wherein the battery associated with the vehicle has a power level that is below the voltage threshold, then the power converter may automatically turn off. In embodiments, the voltage threshold knob allows a user to set the disabling input voltage threshold by turning the voltage threshold knob. Responsive to the user rotating the voltage threshold knob, the automatic disabling input voltage threshold may change. In embodiments, the automatic disabling input voltage threshold may range from 11.0 volts to 13.0 volts, which are based on the power level of a vehicle's battery.

The disabling processor may be a hardware device that is configured to automatically turn off the power converter and/or the electronic accessory if the disabling processor determines that the power level of the vehicle's battery is below or is equal to the disabling input voltage threshold. The disabling processor may turn off the converter and/or the electronic accessory when the vehicle is turned on or when the vehicle is turned off.

In embodiments, responsive to the disabling processor determining that the power level of the vehicle's battery is above the disabling input voltage threshold, the disabling processor may be configured to automatically turn on the power converter and/or electronic accessory. Accordingly, if the vehicle's battery is operational, then the electronic accessory may be automatically turned on. However, if the vehicle's battery may be running out of power, the electronic accessory may be automatically disabled to conserve the vehicle's battery.

The power stabilizer may be a capacitor positioned within the power converter to stabilize the output voltage the electronic accessory (i.e. a dash cam), wherein the power stabilizer may be initiated upon starting the vehicle. In embodiments, the vehicle's battery level may fluctuate/dip significantly when the vehicle's motor is initiated (a.k.a cranked over). Responsive to the power stabilizer determining that the vehicle's motor is initiated, the input power to the power converter may be received from the power stabilizer for a predetermined amount of time, wherein the predetermined amount of time may be any desired length of time. For example, the predetermined amount of time may be one second, two seconds, ten seconds, etc. After the predetermined amount of time, the power converter may receive power from the input converter. Accordingly, when the vehicle's motor is initiated, the power stabilizer may prevent, limit, etc. the electronic accessory (which may already be turned on) from power cycling from an input voltage drop caused by starting the vehicle's motor.

In additional embodiments, the power converter may include a multi-color led positioned on an outer surface of the power converter. The multi-color led may be configured to not emit light when the converter is turned off, emit light in a first color when the power converter is turned on and the battery power sensor determines that the vehicle's battery is below a threshold voltage, and emit light in a second color when the power converter is turned on and the battery power sensor determines that the vehicle's battery is above the threshold voltage.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
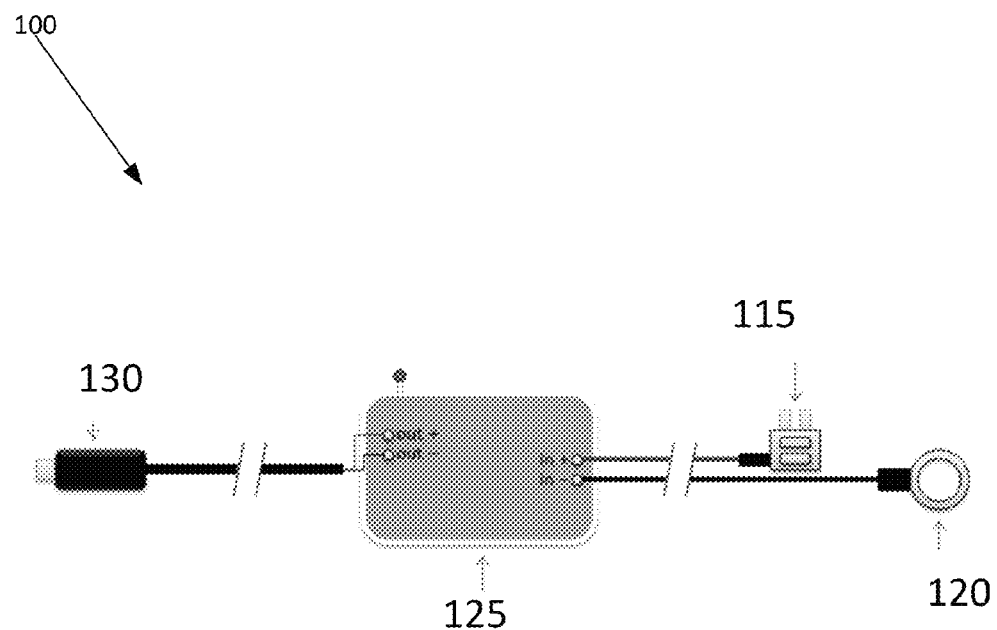
FIG. 1 depicts an internal, power conversion system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for coupling a power converter to a fuse tap. By coupling a power converter directly to a fuse tap, the wiring associated with the power converter and an electronic accessory may be positioned behind a dashboard, within or behind another interior panel, or under the hood of a vehicle.

Embodiments may also be configured to determine a power level associated with a vehicle's battery, and automatically turn off the power converter if the vehicle's power level is below a power threshold.

In further embodiments, the power converter may include a power stabilizer that is configured to be initiated responsive to turning on the vehicle's motor, wherein the power stabilizer may supply power to the power converter for a predetermined amount of time.

FIG. 1 depicts one embodiment of an internal, power conversion system 100. Power conversion system 100 may include an input connection 115, ground connection 120, power converter 125, power output 130, and electronic accessory (not shown). In embodiments, at least a portion each of the elements within power conversion system 100 may be disposed behind a dashboard of a vehicle, such that wires, cables, cords, etc. may not protrude or be visible to a user sitting in a cabin of the vehicle. By eliminating, reducing, and/or limiting cables, cords, etc. from protruding away from a visible power outlet in vehicle's cabin, safety within the cabin of the vehicle may be increased.

Input connection 115 may be a fuse tap configured to be inserted into a fuse connector, wherein input connection 115 may receive power to power the power converter 125. Input connection 115 may be configured to couple with a fuse connector that is a portion of the vehicle's fuse block, inline fuse holders, or fuse clips, wherein the fuse block may be coupled to a first terminal of a battery of a vehicle. In embodiments, the first terminal of the battery of the vehicle may supply power to the fuse block, which in turn may supply power to input connection 115. The fuse block may be positioned underneath the dashboard and in-front of the driver's or passenger's seat, behind the dashboard, underneath seats, behind body panels, etc. For example, the fuse block may be an accessible panel positioned below the steering column. The battery of the vehicle may be configured to supply 12 or 24 DC volts to the fuse block, however one skilled in the art will appreciate that the battery of the vehicle may be configured to supply power with different power parameters to the fuse block.

Input connector 115 may be a fuse tap that is comprised of various materials and/or shapes. For example, input connector 115 may be shaped as a blade fuse, fusible link, etc. In embodiments, input connection 115 may be a fuse repeater, wherein another fuse tap may be coupled to input connection 115. Accordingly, multiple fuse taps may be coupled to input connector 115. The other fuse taps may be utilized to provide overcurrent protection for power conversion system 100, wherein the other fuse taps may interrupt a current through input connector 115 if excessive current is present through input connector 115.

Ground connection 120 may be a hardware device that grounds an electrical circuit associated with power converter 125 and input connection 115. Ground connection 120 may be coupled to a second terminal of the battery of the vehicle, wherein the second terminal is attached to a ground plane or another device that is configured to operate as a return path for current associated with input connection 115 and/or power converter 125.

Power converter 125 may be a hardware device configured to receive power from input connector 115, and convert the received power to a different voltage and/or have different power parameters. Power converter 125 may be an external power converter with respect to the electronic accessory, wherein power converter 125 is not embedded within the electronic accessory.

In embodiments, power converter 125 may be directly coupled to input connector 115 (e.g. a fuse tap), wherein power converter 125 may be coupled to input connector 115 behind a dashboard of the vehicle, such that power converter 125 and/or input connector 115 are not visible to a user within the cabin of the vehicle. Furthermore, power converter 125, input connector 115, and/or ground connection 120 may not extend into the cabin of the vehicle. In embodiments, power converter 125 may be configured to convert the power received from input connector 115 to vary the power parameters of power supplied from the vehicle's battery. For example, power converter 125 may be configured to step-up or step-down the voltage level of the battery (e.g. convert a 12 volt power source to a 5 volt power source). In embodiments, power received from input connector 115 may be independent of power supplied by other accessories coupled to the other fuse taps positioned on input connector 115. Accordingly, power converter 125 may operate independently to the other devices coupled to input connector 115.

Power output 130 may be a hardware device configured to receive the converted power from power converter 125, and transmit the converted power to the electronic component (i.e. a dashboard camera). Power output 130 may include a universal serial bus (USB) or coaxial cable configured to transfer power between power converter 125 and the electronic accessory. Although one skilled in the art will appreciate that power output 130 may be comprised of various devices to transfer power over various communications protocols. Power output 130 may be a male coupling member configured to be inserted into a female coupling member positioned on the electronic component, or vice versa. In embodiments, a cable, cord, etc. associated with power output 130 may be disposed behind a dashboard of a vehicle, such that the cable, cord, etc. may not be visible to a user in the cabin of the vehicle, wherein only the male coupling member may be visible to the user.

The electronic accessory may be a hardware device configured to receive power from the power output 130, wherein different electronic accessory may provide varying functionality. For example, an electronic accessory may be a dashboard camera configured to continuously record video. The dashboard camera may be configured to continuously record video when the vehicle is turned on, the vehicle is turned off, while the vehicle is in motion, and/or based on a power level of the battery in the vehicle. In embodiments, the electronic accessory may require power parameters that are different than a conventional 12 volt cigarette receptacle and/or power parameters associated with a vehicle's battery. Therefore, the electronic accessory may require that the power supplied from the battery of the vehicle be converted via power converter 125 before receiving power.

In embodiments, the electronic accessory may be a mobile device configured to be removed from a vehicle, wherein the electronic accessory may operate remotely from the vehicle. Furthermore, the electronic accessory may be interchanged with a second electronic accessory, if the second electronic accessory is configured to operate with the same power parameters as output from power output 130. In further embodiments, while the electronic accessory is disposed within the vehicle, the electronic accessory may be the only element of power conversion system 100 that is visible to a user positioned in the cabin of the vehicle.

In embodiments, the electronic accessory may be placed within an arm's reach of the driver's seat, but not mounted in a location that obstructs the user's view of the road. For example, the electronic accessory may be positioned directly below a rear view mirror.

Figure 2:
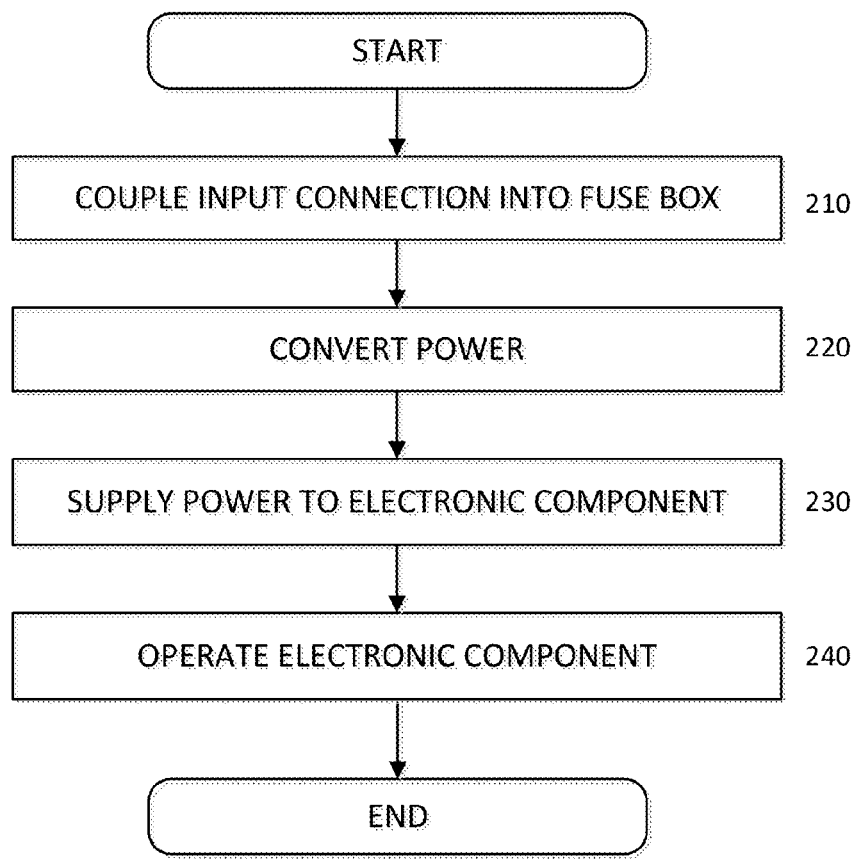
FIG. 2 depicts a method for supplying power to an electronic accessory, according to an embodiment.

FIG. 2 depicts an embodiment of a method 200 for supplying power to an electronic accessory without elements of a power converter being visible to a user within a cab of a vehicle, wherein the power converter is directly coupled to a fused circuit. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

At operation 210, an input connection may be directly coupled to a fuse box in a vehicle, wherein the input connection may be shaped as a fuse tab. input connection may be configured to receive power from a battery of a vehicle via a fused circuit on the fuse box. In embodiments, the fuse box may include a plurality of different fused circuits, wherein different input connections may be coupled to different fused circuits.

At operation 220, the input connection may supply power to a power converter, and the power converter may convert the received power to different power parameters. The power converter may be configured to step-up or step-down the power supplied from the input connection, wherein the input connection may supply power to the power converter with power parameters associated with the battery of the vehicle. In embodiments, the power converter may be positioned behind a dashboard of the vehicle, such that a user within the cabin of the vehicle may not view the power converter.

At operation 230, the power converter may supply power, with the converted power parameters, to an electronic component. In embodiments, the power converter may include an output connection that is entirely or mostly positioned behind the dashboard of the vehicle, wherein only a male coupling portion of the power converter may be visible to a user within the cabin of the vehicle.

At operation 240, responsive to receiving power from the power converter the electronic accessory may be turned on and operated by the user within the cabin of the vehicle.

Figure 3:
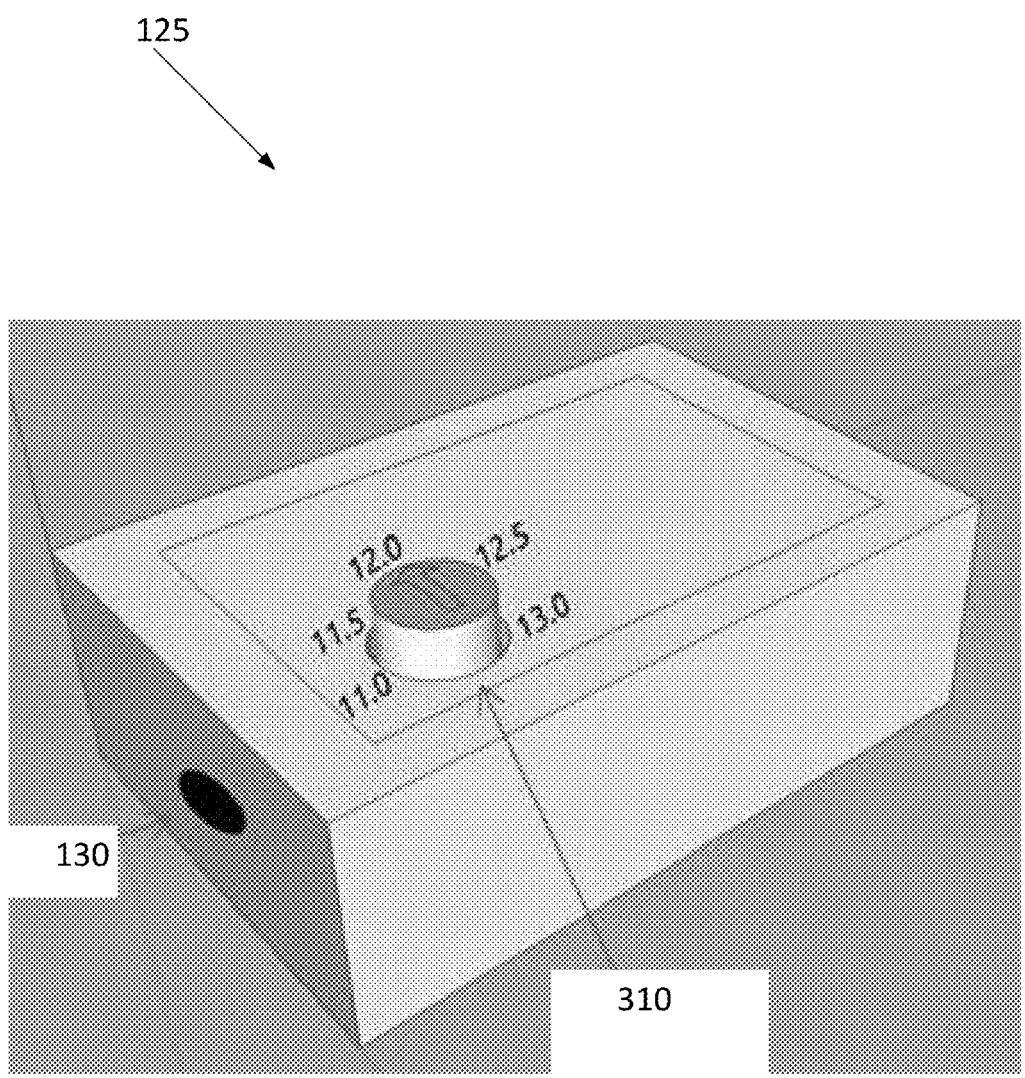
FIG. 3 depicts a power converter, according to an embodiment.

FIG. 3 depicts a power converter 125, according to an embodiment. Elements associated with power converter 125 may be described above. For the sake of brevity, another description of these elements is omitted.

Power converter 125 may include an internal battery power sensor (not shown), a voltage threshold knob 310, a disabling processor (not shown), and a power stabilizer (not shown).

The battery power sensor may be a hardware device positioned within power convertor 125 that is configured to determine a power level of the vehicle's battery responsive to the vehicle's motor being initiated, turned off, continuously while the vehicle's motor is running, and/or at predetermined intervals (i.e. every second, every ten seconds, every minute, etc.). The battery power sensor may be configured to determine the power level of the vehicle's battery based on a power level received by the input connector associated with power converter 125.

Voltage threshold knob 310 may be a hardware device positioned on an external surface of power converter 125. Voltage threshold knob 310 may be configured to set an automatic disabling input voltage threshold. The automatic disabling input voltage threshold may be associated with the power level of the vehicle's battery, wherein when the voltage threshold of the vehicle's battery falls below the disabling input voltage threshold, then the power converter may turn off. In embodiments, the voltage threshold knob 310 may enable to allow a user to set the disabling input voltage threshold by turning the voltage threshold knob. Accordingly, the disabling input voltage threshold may be set and dynamically changed by a user. Responsive to the user rotating voltage threshold knob 310, the automatic disabling input voltage threshold may change. In embodiments, the automatic disabling input voltage threshold may range from 11.0 volts to 13.0 volts, which are based on the power level of a vehicle's battery. Therefore, based on the different power parameters associated with a vehicle, the voltage threshold may be changed by an end user.

The disabling processor may be a hardware device that is configured to automatically turn off the power converter 125 and/or the electronic accessory if the disabling processor determines that the power level of the vehicle's battery falls below or is equal to the disabling input voltage threshold. The disabling processor may turn off the power converter 125 and/or the electronic accessory when the vehicle is turned on or the vehicle is turned off. In embodiments, responsive to the disabling processor determining that the power level of the vehicle's battery is above the disabling input voltage threshold, the disabling processor may be configured to automatically turn on the power converter 125 and/or electronic accessory. Accordingly, if the vehicle's battery is operational and above a desired power level, then the electronic accessory may be consistently turned on. However, if the vehicle's battery may be running out of power, the electronic accessory may be automatically disabled to conserve the vehicle's battery.

Figure 4:
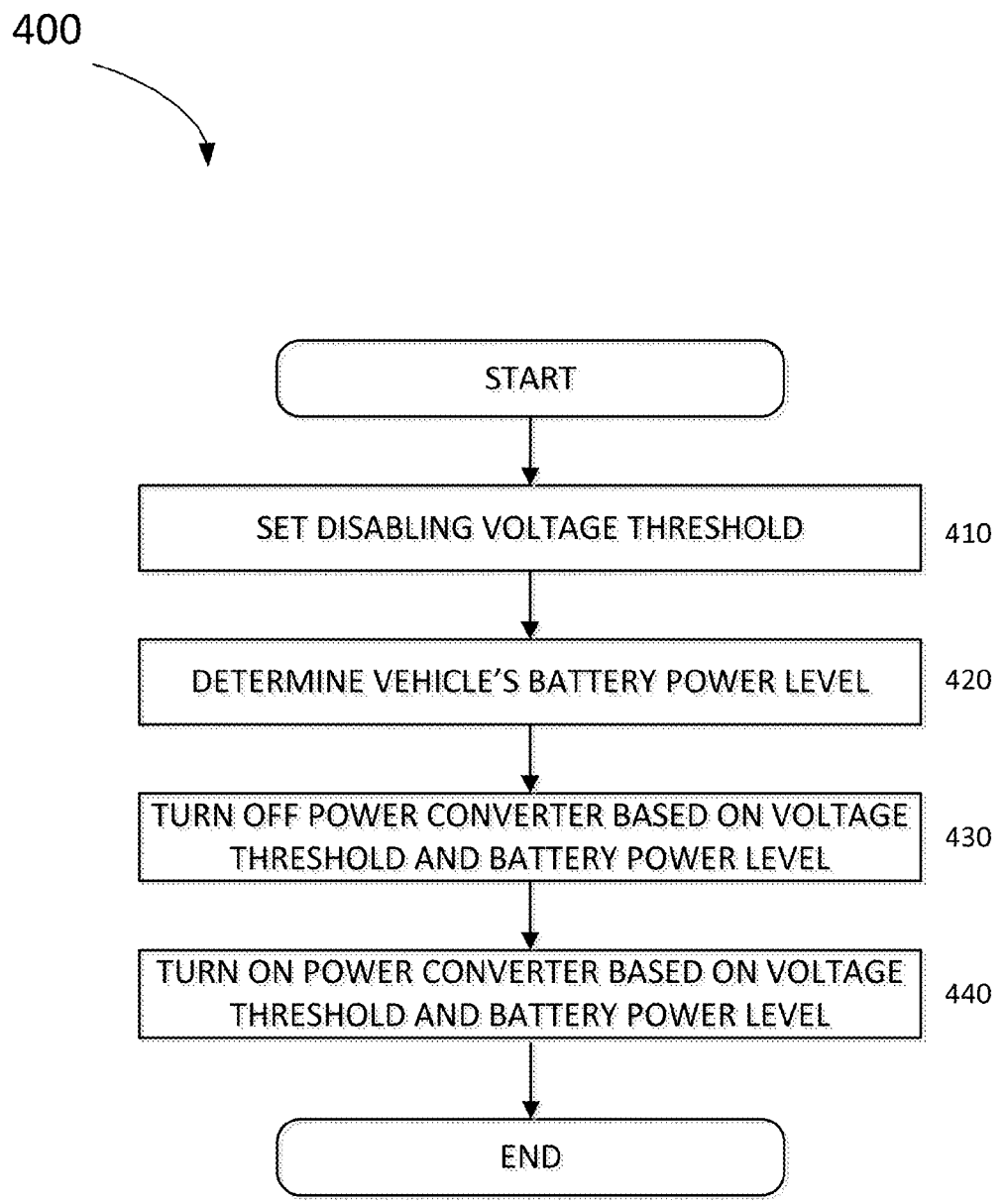
FIG. 4 depicts a method for supplying power to an electronic accessory, according to an embodiment.

FIG. 4 depicts an embodiment of a method 400 for supplying power to an electronic accessory without elements of a power converter being visible to a user within a cab of a vehicle, wherein the power converter is directly coupled to a fused circuit. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a disabling input voltage threshold may be set by a user of a vehicle. In embodiments, the disabling voltage threshold may be set by a user turning a knob or any other desirable user interface. The disabling voltage threshold may be dynamically changed while a vehicle is turned on or off. In further embodiments, the disabling voltage threshold may be set as a default voltage.

At operation 420, the vehicle's battery power level may be determined. The vehicle's battery power level may be determined at an input of a power converter, wherein the power converter is configured to step up or step down power parameters of the vehicle's power. Accordingly, the vehicle's batter power level may be determined before the power parameters of the vehicle's battery are changed.

At operation 430, it may be determined that the vehicle's battery power level is below the disabling voltage threshold. Responsive to determining that the vehicle's battery power level is below the disabling voltage threshold, the power converter may automatically turn off.

At operation 440, after the power converter is turned off because the vehicle's battery power level is below the disabling voltage threshold, it may be determined that the vehicle's battery power level is above the disabling voltage threshold. Responsive to determining that the vehicle's battery power level is above the disabling voltage threshold, the power convert may automatically turn on.

Figure 5:
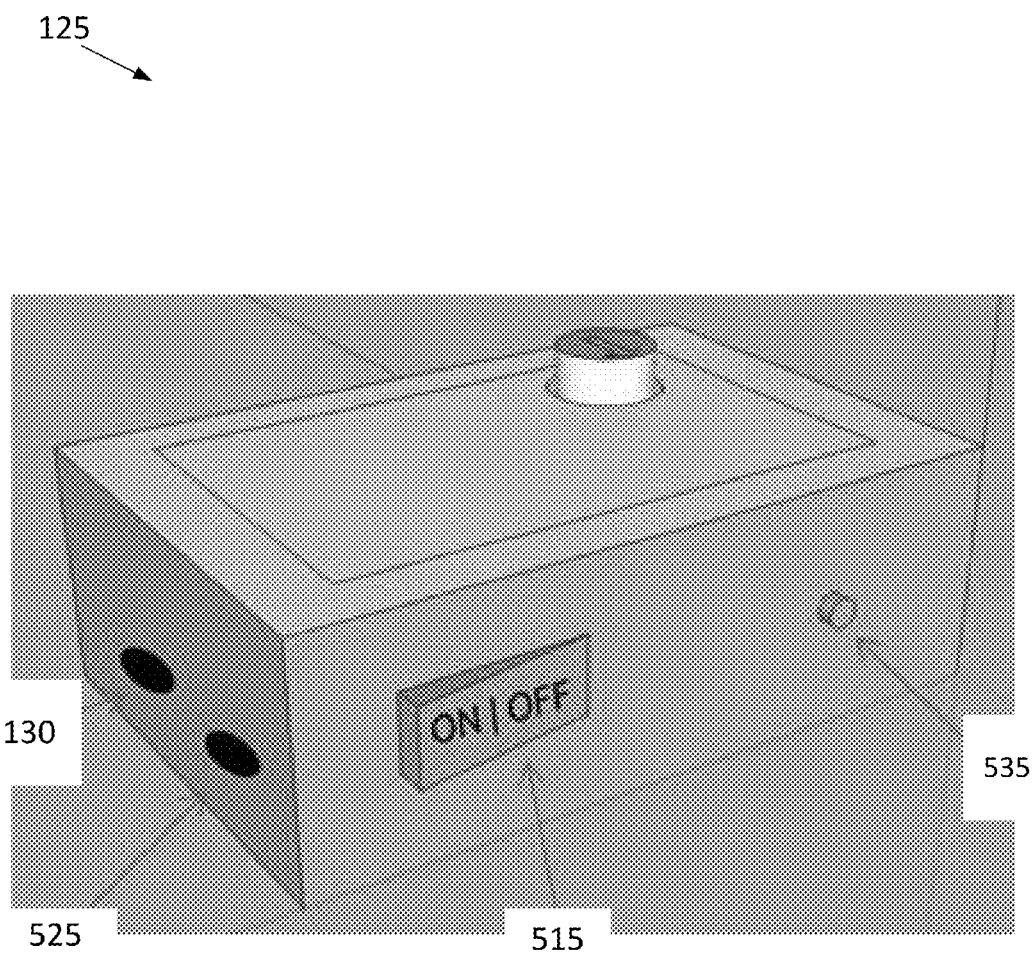
FIG. 5 depicts a power converter, according to an embodiment.

FIG. 5 depicts a power converter 125, according to an embodiment. Elements associated with power converter 125 may be described above. For the sake of brevity, another description of these elements is omitted. In embodiments, power converter 125 may include a toggle switch 515, a toggle switch override cable 525, a power stabilizer (not shown), and a multi-color led 535.

Toggle switch 515 may be a hardware device to disable the electronic accessory receiving power from the power output. Toggle switch 515 may be a binary on/off button that is positioned on an outer surface of power converter 125. Responsive to toggle switch 515 being in the on position, the electronic accessory may receive power from power converter 125. Responsive to toggle switch 515 being in the off position, the electronic accessory may not receive power from the power converter 125.

Toggle switch override cable 525 may be a cable that extends away from the power converter 125. Toggle switch override cable 525 may be a binary on/off button that can override toggle switch 515. Responsive to toggle switch override cable 525 being in the on position, the electronic accessory may receive power from the power converter 125. Responsive to the toggle switch override cable being 525 being in the off position, the electronic accessory may not receive power from the power converter 125. Furthermore, the toggle switch override cable 525 may override the toggle switch 515. For example, if the toggle switch 515 is in the on position but the toggle switch override cable 525 is in the off position, the electronic accessory may not receive power from the power converter 125. Furthermore, if the toggle switch 515 is in the off position but the toggle switch override cable 525 is in the on position, the electronic accessory may receive power from the power converter 125.

The power stabilizer may be a capacitor positioned within the power converter 125. The power stabilizer may be configured to stabilize the output voltage transmitted to the electronic accessory. In embodiments, the vehicle's battery may fluctuate when the vehicle's motor is initiated. Accordingly, the power stabilizer may be initiated responsive to the power stabilizer determining that the vehicle's motor is initiated. Responsive to the vehicle's motor being initiated, the power stabilizer may also be initiated, wherein the input power to the power converter 125 may be received from the power stabilizer instead of the vehicle's battery for a predetermined amount of time. The predetermined amount of time may be any desired length of time. For example, the predetermined amount of time may be one second, two seconds, ten seconds, etc. After the predetermined amount of time, the power converter 125 may receive power from the input converter. Accordingly, when the vehicle's motor is initiated, the power stabilizer may prevent, limit, etc. the electronic accessory (which may already be turned on) from power cycling from an input voltage drop caused by starting the vehicle's motor.

The multi-color led 535 positioned on an outer surface of the power converter 125. The multi-color led 535 may be configured to not emit light when the converter is turned off, emit light in a first color when the power converter 125 is turned on and the battery power sensor determines that the vehicle's battery is below a threshold voltage, and emit light in a second color when the power converter 125 is turned on and the battery power sensor determines that the vehicle's battery is above the threshold voltage.

Figure 6:
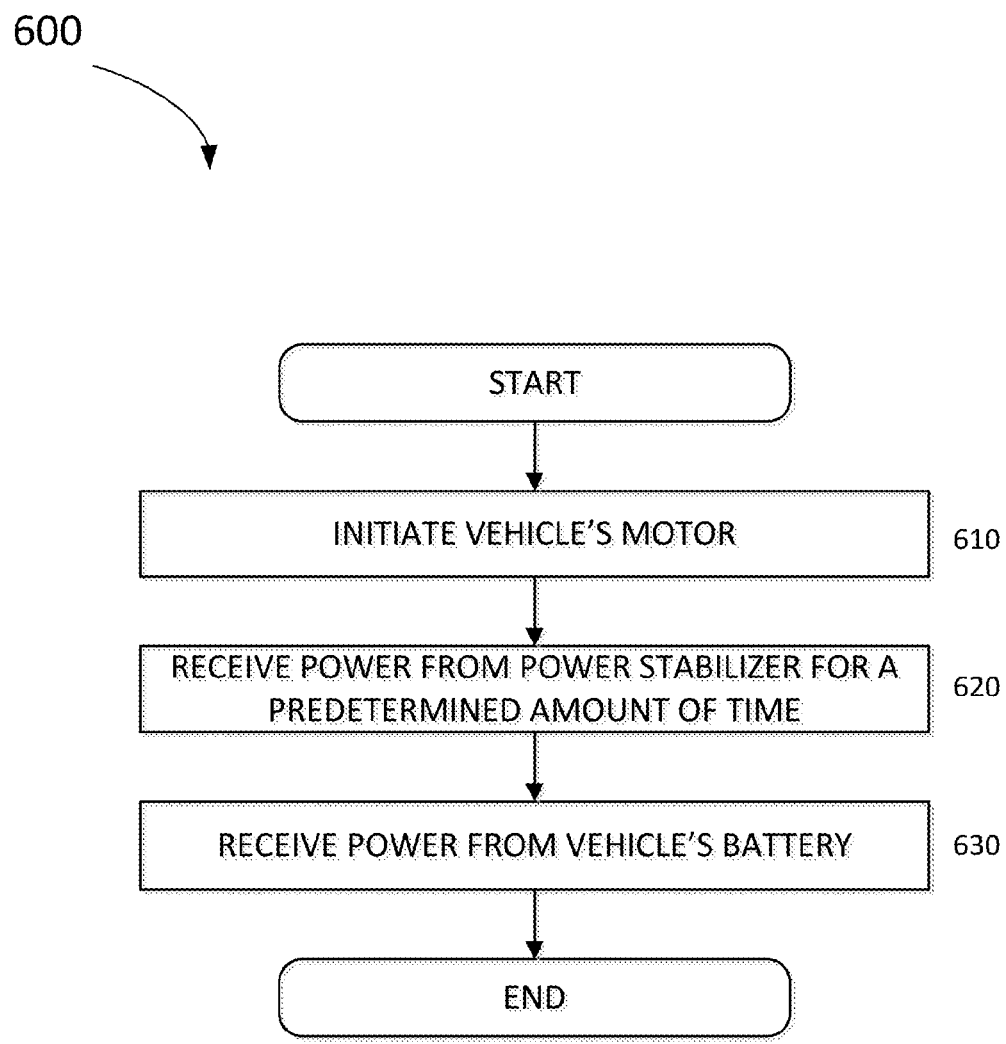
FIG. 6 depicts a method for supplying power to an electronic accessory, according to an embodiment.

FIG. 6 depicts an embodiment of a method 600 for supplying power to an electronic accessory without elements of a power converter being visible to a user within a cab of a vehicle, wherein the power converter is directly coupled to a fused circuit. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At operation 610, a vehicle's motor may be initiated. Before the vehicle's motor is initiated, an electronic accessory may be receiving power from the vehicle's battery.

At operation 620, responsive to determining that the vehicle's motor is initiated, the electronic accessory may receive power from a power stabilizer for a predetermined amount of time.

At operation 630, responsive to the predetermined amount of time lapsing, the electronic accessory may receive power from the vehicle's battery.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A power conversion system comprising:
an input connection directly coupled with a fuse block of a vehicle and configured to receive power from a battery of the vehicle, wherein the input connection is a fuse tap;
a power converter configured to change power parameters of the battery of the vehicle, wherein the power converter is configured to step down a power level of the battery of the vehicle;
a power output configured to transmit power with the changed power parameters to an external electronic device, wherein the electronic device is a dashboard camera configured to record video based on a power level of the battery of the vehicle;

a battery power sensor configured to determine the power level of the battery of the vehicle;

a voltage threshold knob configured to set a voltage threshold, wherein the voltage threshold can be dynamically changed by a user;

a disabling processor configured to automatically turn off the power converter responsive to determining that the power level of the battery of the vehicle is below the voltage threshold;

a power stabilizer configured to store power, wherein the power stabilizer is configured to supply the stored power to the power converter responsive to determining that a motor of the vehicle is initiated, wherein the power stabilizer is external from the battery of the vehicle.

2. The system of claim 1, wherein the voltage threshold knob is positioned on an external surface of the power converter.

3. The system of claim 1, wherein responsive to the disabling processor determining that the power level of the battery of the vehicle is above the voltage threshold, the power converter will automatically turn on.

4. The system of claim 3, wherein the battery power sensor is configured to determine the power level of the battery of the vehicle when the vehicle is turned off.

5. The system of claim 4, wherein the electronic device is turned on when the vehicle is turned off.

6. The system of claim 3, wherein the battery power sensor is configured to determine the power level of the battery of the vehicle when the vehicle is turned on.

7. The system of claim 1, wherein the power stabilizer is configured to supply the stored power to the power converter for a predetermined amount of time.

8. The system of claim 7, wherein after the predetermined amount of time the power converter receives power from the battery of the vehicle.

* * * * *